United States Patent [19]

Gunsher et al.

[11] 4,112,209

[45] Sep. 5, 1978

[54] PROCESS FOR MAKING POLYSTYRENE

[75] Inventors: Jeffrey A. Gunsher, Midland; Joseph L. Garner, Sanford, both of Mich.; Conrad O. M. Miller, Concord, Calif.

[73] Assignee: The Dow Chemical Company, Midland, Mich.

[21] Appl. No.: 811,511

[22] Filed: Jun. 30, 1977

Related U.S. Application Data

[63] Continuation-in-part of Ser. No. 715,585, Aug. 18, 1976, abandoned.

[51] Int. Cl.$^2$ ............................................... C08F 4/14
[52] U.S. Cl. ................................... 526/65; 260/669 P; 526/237; 526/346
[58] Field of Search ................ 260/669 P; 526/64, 65, 526/237, 346

[56] References Cited

U.S. PATENT DOCUMENTS

| | | | |
|---|---|---|---|
| 2,499,796 | 3/1950 | Surmatis | 526/346 |
| 3,385,905 | 5/1968 | Smith | 260/669 P |
| 3,763,256 | 10/1973 | Massie | 260/669 P |
| 3,769,359 | 10/1973 | Massie | 260/669 P |
| 3,988,284 | 10/1976 | Wurmb | 260/669 P |

*Primary Examiner*—Paul R. Michl
*Attorney, Agent, or Firm*—David H. Fifield

[57] ABSTRACT

Disclosed is a method for making polystyrene with $\bar{M}_w$ between about 200 and about 50,000 and $\bar{M}_w/\bar{M}_n$ ratio of less than about 8 by cationically polymerizing styrene monomer under substantially isothermal conditions where the conversion of styrene monomer is carried out in 2 or more stages by contacting with a cation generator. The polystyrene product finds utility as plasticizer for high molecular weight polystyrenes, as a binder resin in various coating applications, and as a precursor for further functionalized polystyrene derivatives. For example, a polystyrene of about 13,000 $\bar{M}_w$ and $\bar{M}_w/\bar{M}_n$ of about 4.9 is prepared by contacting styrene monomer with $BF_3$ in 4 stages between a temperature of about 60° C and about 80° C.

12 Claims, No Drawings

PROCESS FOR MAKING POLYSTYRENE

CROSS-REFERENCE TO RELATED APPLICATION

This is a continuation in part of our application Ser. No. 715,585 filed Aug. 18, 1976, now abandoned. Copending application Ser. No. 668,335 filed Mar. 19, 1976, now U.S. Pat. No. 4,071,666, of Garner teaches the use of the instant process to prepare precursors for an electroconductive resin composition.

BACKGROUND OF THE INVENTION

Radical polymerization of styrene is well-known in the art and is suitably accomplished by subjecting styrene monomer to elevated temperatures in the range of about 150° and 250° C; U.S. Pat. No. 3,859,268. Generally styrene addition polymers contain lower oligomers, for example, cyclic dimers and trimers, which impart undesirable physical properties to these products and may impart toxic properties to further functionalized polystyrene derivatives. They may contain residual unsaturation which also renders such products less useful for applications where the color of such products is detrimental and where further functionalized materials, e.g., chloromethylated and quaternary ammonium derivatives, are used since cross-linking may occur in the processing of such materials as a result of the residual unsaturations rendering the products unfit for the intended utilities. Generally, thermally polymerized polystyrene has a wide molecular weight distribution rendering it less suitable for certain applications which require sharp melting points.

Cationic polymerization of styrene monomer with a proton acid is one of the early polymerization reactions studied; U.S. Pat. No. 2,499,796. Cationic polymerization of styrene and other ethylenically unsaturated monomers has been widely studied on a lab scale, "The Chemistry of Cationic Polymerization" (P. H. Plesch, Editor, 1963) and has been used commercially for production of synthetic rubber from isobutylene alone or with comonomers such as styrene, etc. but at low temperatures generally of less than about 0° C and preferably lower; U.S. Pat. Nos. 2,974,126 and 2,643,993. α-Methylstyrene has also been cationically polymerized but likewise at sub-zero temperatures; U.S. Pat. Nos. 3,669,947 and 2,941,989. t-Butylstyrene has been cationically polymerized at more convenient temperatures of about 25° C to 125° C but gives a very low molecular weight product of about 500–2500; U.K. Pat. No. 1,232,610.

Styrene alone has been cationically polymerized but at low temperatures on the order of −50° C to −150° C; U.S. Pat. No. 2,436,614. At ambient temperature the reaction has primarily been studied as a laboratory curiosity generally for kinetic and mechanistic purposes; see for example Chapter 6 of Plesch, previously cited. Perhaps the lack of commercial interest in the cationic polymerization of styrene is due to poor physical properties of products heretofore obtained from such processes as is evidenced by comments found in "Cationic Polymerization of Olefins: A Critical Inventory" Joseph P. Kennedy (Wiley-Interscience, 1975) at page 229 and at page 238 where he concludes that the process will probably remain unattractive for large-scale commercial exploitation in the future.

SUMMARY OF THE INVENTION

We have discovered that highly useful polystyrene of good physical properties having a weight average molecular weight (hereinafter $\overline{M}_w$) between about 200 and about 50,000 and a molecular weight distribution (hereinafter $\overline{M}_w/\overline{M}_n$) ratio of less than about 8 may be prepared by a process comprising contacting, in 2 or more stages, a solution of styrene monomer in a first inert organic diluent with a cation generator, under substantially isothermal conditions in each stage, at a temperature between about 0° C and about 180° C in a manner such that said styrene monomer, prior to the final stage, is always present in greater than a stoichiometric amount with respect to said cation generator. By "substantially isothermal" we mean that the temperature profile of the reaction mass is within a temperature range of about 60° C, preferably of about 40° C and most preferably of about 20° C from start to finish of the process. A broadening or narrowing of this range will broaden or narrow the $\overline{M}_w/\overline{M}_n$ ratio, respectively.

We prefer to utilize a cation generator that is produced by contacting boron trifluoride with an activating amount of water and most preferably producing same in situ in the solution of styrene monomer. It is further preferred that the boron trifluoride be employed as a solution of $BF_3$ in a second inert organic diluent which may be the same as the first inert organic diluent mentioned above. Preferably both first and second inert organic diluents are the same. Preferably the cation generator and styrene monomer are contacted by injecting 2 or more portions of cation generator in an equal number of stages into the solution of styrene monomer, more preferably said injection is carried out in 3 or more portions and stages, and most preferably 4 or more portions and stages. Because this process can be run at temperatures near ambient or above, cumbersome and expensive refrigeration equipment is not required as it has been with some prior art processes.

In a preferred embodiment, polystyrene having $\overline{M}_w$ between about 10,000 and about 30,000 and a $\overline{M}_w/\overline{M}_n$ ratio between about 2 and about 6 is prepared by a process comprising contacting about a 50 weight percent or less solution of styrene monomer in an inert organic diluent, which solution contains about 10 to about 100 ppm water, with about 1,000 to about 2,000 ppm boron trifluoride (both based on styrene monomer weight) by continuously passing the solution of styrene monomer through a tubular reactor and continuously injecting, in 2 or more portions, the boron trifluoride into the solution of styrene monomer at 2 or more injection points along the path of flow of the solution of styrene monomer and removing sufficient heat of polymerization from the resultant polystyrene and solution of styrene monomer (also referred to herein as reaction mass) along the segment of the path of flow subsequent to each injection point so that the temperature of the resultant polystyrene and solution of styrene monomer in said segment varies not more than about 15° C from the temperature of this reaction mass at the point of injection prior thereto, provided that the temperature of the mixture following the final injection point may vary more than about said 15° C. By raising the temperature profile of the reaction process, $\overline{M}_w$ may be lowered and, conversely, by lowering the profile $\overline{M}_w$ may be raised.

In another preferred embodiment, polystyrene having $\overline{M}_w$ between about 200 and about 1,000 and a $\overline{M}_w/\overline{M}_n$ ratio of about 3 or less is prepared in an inert organic diluent in the manner described above, at a temperature of about 90° to about 180° C, preferably at about 100°–160° C. Other conditions are maintained as in the preceeding paragraph.

Generally when a $BF_3$-water cation generator is employed, the total amount of $BF_3$ contacted with styrene monomer solution is about 500 to about 2500, preferably about 1000–2000, ppm based on total weight of styrene monomer. The total amount of water is about 0.5 to about 10, preferably about 2 to 6 percent based on the total weight of $BF_3$. For a continuous flow process, these amounts are calculated on the basis of product recovered per unit time with a known flow rate and known reactor vessel cross-sectional area. In this manner, good control of cation generator production can be maintained by addition of $BF_3$ solution at a set rate.

Polystyrene produced by the invention process is useful as a plasticizer for high molecular weight polystyrene for molding applications and the like. It is useful in applications, such as a binder in heat sensitive reprographic toners, where a sharply defined melting point is particularly useful and is useful in other coating applications as a binder resin for pigments and other additives. It is especially useful, in the intermediate $\overline{M}_w$ range, as a precursor for chloromethylated and quaternized polystyrenes which are employed as water-soluble, cationic flocculants and filter aids.

DETAILED DESCRIPTION OF THE INVENTION

Materials

The monomer to be employed in the instant process may be commercially available styrene monomer and may contain up to about 100 ppm water when the monomer is to be used with a cation generator which is not detrimentally affected by such levels of water.

Since the process is to be carried out in solution, the styrene monomer is first dissolved in an inert organic diluent which is a solvent for styrene monomer up to about 80 weight percent concentration of styrene, preferably the concentration of styrene monomer in the diluent will be less than about 50 weight percent. The diluent is not reactive with styrene monomer or appreciably with the cation generator except that it may act to some extent as a "co-catalyst", accelerating the activity of the cation generator as discussed hereafter. The diluent may generally be described as an aromatic or aliphatic hydrocarbon or halohydrocarbon, which is liquid at the temperatures of the polymerization reaction and which preferably has a boiling point in the range of about 80° C. –100° C. for easy separation from the resultant polystyrene product, upon completion of the reaction. When product above about 1,000 $\overline{M}_w$ is prepared, it is preferably a polar liquid and most preferably is 1,2-dichloroethane (hereafter EDC). When a product below about 1,000 $\overline{M}_w$ is prepared, it is preferably a nonpolar liquid such as ethylbenzene, toluene or benzene, most preferably toluene. A number of suitable diluents are discussed in the literature pertaining to cationic polymerization of styrene, as in Chapter 6 of the Plesch publication, and include for example, carbon tetrachloride, ethyl chloride, methylene dichloride, benzene, toluene, ethylbenzene, nitrobenzene, chlorobenzene, isopropyl chloride t-butyl chloride, hexane, cyclohexane, sulfur dioxide, DMF, and the like.

Cation Generator

The term cation generator, as it is employed herein, means any of the commonly known "catalysts" for cationic polymerization of styrene, including any necessary "co-catalyst", as defined hereafter. For example, the protonic acids such as sulfuric, hydrochloric, phosphoric, perchloric, dichloro- and trichloroacetic acids, and preferably the Friedel-Crafts catalysts, such as boron trichloride, boron trifluoride, its etherate, stannic chloride, titanium tetrachloride, aluminum halides and alkyl aluminum halides, in conjunction with any necessary "co-catalyst". A small quantity of water is a common co-catalyst for most of the Friedel-Crafts catalysts and also for protonic acids but other co-catalysts are also known and are often dependent on the solvent employed. Without such a co-catalyst, the polymerization proceeds very slowly if at all. More details regarding co-catalytic effects for cationic polymerization of styrene are found at pages 241–251 of Plesch. The detailed chemistry of cationic polymerization of styrene is contained in Chapter 6 of Plesch, pages 236–300.

Preferred as cation generators in the instant invention are $BF_3$ or $AlCl_3$ with a water co-catalyst, and the $BF_3$-water system is especially preferred.

The cation generator is employed in an amount that is, in total, about the stoichiometric amount or greater for the total styrene monomer to be polymerized. By stoichiometric amount is meant a quantity sufficient to polymerize substantially all the styrene monomer such that less than about 0.1 weight percent residual unsaturation remains in the polystyrene product. For a $BF_3$-water cation generator this amounts to about 500 to about 2500 ppm, based on styrene monomer.

One particularly critical feature of the process is careful control of the cation generator content. If a large excess of co-catalyst is in contact with the styrene monomer prior to contact of the other component of cation generator with the co-catalyst, the excess co-catalyst may suppress formation of the cation generator. Proton donors such as water and ammonia and the like may cause this to occur. It is then necessary to add more and more of the other component until a latent "catalytic" effect takes place. This may occur at a second or third stage in the process, in effect transforming said stage into a first reaction stage. At this point, an unexpectedly large amount of cation generator may be formed in situ and a runaway reaction may occur. A similar effect may occur if one attempts to add a stoichiometric amount of cation generator in a single stage. It is also noted that a single addition of cation generator is less efficient since the total cation generator required for complete reaction is greater than when the reaction is carried out in stages.

At the levels of water and $BF_3$ indicated, one preferably injects about 20 to 50 percent of the total $BF_3$ in the first stage, most preferably about 25 to 40 percent. The rest is added in more or less equal amounts over the remaining stages of the process. An excess of cation generator in the final stage of the process is not detrimental and in fact is desirable to insure residual unsaturation is reduced to a minimum.

Reactor Vessel

The reactor vessel employed in the process of the invention is suitably a kettle, pipe or series thereof or other standard reaction vessels designed to contain a solution of styrene monomer and made of material generally impervious to the reactants. Stainless steel, Hastelloy, Incoloy, Inconel alloys and the like are suitable such materials. The design of the reactor must be such that the cation generator can be added or formed in situ in 2 or more stages as the reaction progresses. It is preferred to use a closed tubular reactor in order to carry out a continuous flow process, feeding a solution of styrene monomer at one end and recovering product at the other. Similarly, a series of kettle reactors may be employed in the fashion of U.S. Pat. No. 2,643,993.

When operating in the higher temperature range, i.e., about 100°–180° C, the vessel should be capable of withstanding mild pressures of several atmospheres, e.g., 15–100 psia, since it is desirable to maintain the reaction mass under such pressures, at least greater than the autogenous pressure of the system, so that the reaction may be carried out in the liquid phase.

In a tubular reactor, same is provided with injection sites along the longitudinal axis of the vessel to permit introduction of portions of the cation generator, with good mixing, at 2 or more, preferably 3 or more, and most preferably 4 or more points along the path of flow of the styrene monomer solution through the reactor vessel. By "tubular" is not necessarily meant a cylindrical-shaped object but merely an elongated enclosed chamber which may conveniently be two or more segments of pipe of standard size and schedule joined to form the reactor vessel and having a cross-sectional area sufficient to accommodate a flow rate of the reaction mass as desired. Alternatively, the reactor vessel may be a pipe wound into the shape of a coil or may be rectangular or triangular in cross-sectional area but a circular cross-section is most convenient and desirable for the purposes of the invention.

In such a reaction vessel the injection points, for example, a T-section coupling two segments of pipe, are incorporated at relatively regular distances along the length of the reaction mass's path of flow. For example, for about a 20-foot tubular reactor with 4 injection points, the points of injection will be spaced about 5 feet apart.

In the path of flow of the reaction mass immediately subsequent to the point of injection, it is desirable to place a suitable mixing device such as an interfacial surface generator or a set of baffles to insure good mixing between the injected material and the rest of the reaction mass.

To remove the heat of reaction generated upon contact between the cation generator and the styrene monomer at each stage of the reaction, it will ordinarily be necessary to have a heat exchanger means in contact with the surface of the reaction vessel. This may be accomplished by jacketing the reaction vessel with a suitable amount of a heat transfer medium or by passing the heat exchange fluid through the reaction medium in one or more conduits. For example, the stages of the reaction vessel may be made of interconnected shell and tube heat exchangers with the reaction mass passing through the tubes and the heat transfer medium passing through the shell or vice versa. The size of the reaction vessel and the heat exchangers is not critical but the sizes should be of proportion such that the capacity of the heat exchanger is sufficient to remove the heat of reaction at such a rate that under reaction conditions, except for the segment following the last stage of injection, the temperature rise in a segment following a point of injection may be limited to less than about 15° C.

The proton generator is conveniently contacted with the styrene monomer by injecting a solution of the proton generator into the styrene solution or by contacting the styrene monomer with a solution of the proton generator's precursor which thereupon forms the proton generator in situ in the styrene monomer. Such is the case when boron trifluoride is added to a styrene monomer solution which contains suitably small quantities of water.

A solution containing the proton generator, or a slurry of said proton generator is conveniently prepared in an organic solvent which is preferably the same medium as the diluent employed for the styrene monomer. In the case of boron trifluoride and other gases, a solution may be prepared by contacting the gas with an organic solvent therefor in a closed chamber under pressure such that a known concentration of the gas is dissolved in the organic diluent. The concentration of said gas in solution may be calculated by utilization of Henry's law. For $BF_3$, the concentration of $BF_3$ is equal to the equilibrium partial pressure of $BF_3$ divided by a constant for $BF_3$ at a given temperature. Henry's law constants can be calculated experimentally by known methods. With this knowledge of the concentration of $BF_3$ in solution, a suitable amount of the solution may be metered into the reaction vessel injection points at such a speed that a relatively constant concentration of the $BF_3$, based on styrene monomer, may be maintained at all times.

For a process which employs $BF_3$-water as the cation generator, the following relationships are useful in ethylene dichloride (EDC) as the organic diluent:

$BF_3$ equilibrium partial pressure (in psia) = $P = K_o + (K) \times$ (weight percent dissolved $BF_3$). For EDC containing about 260–280 ppm water, the relationships are:

at about 23° C, $K_o = -7.3$ and $K = 68.5$;
at about 39° C, $K_o = -6.4$ and $K = 77.2$.

In EDC containing about 1100 ppm water, $K_o = -33.7$ and $K = 73.6$ at about 39.5° C. In the above relationships, the partial pressure of EDC has been factored out and the effect of formation of a $BF_3$-water complex is included in $K_o$ so that weight percent dissolved $BF_3$ includes the $BF_3$ of this complex.

Practically, preparation of $BF_3$ proton generator may be accomplished by pressurizing a vessel, containing the organic diluent, with $BF_3$ gas at a known pressure, constantly removing a portion of the solution of $BF_3$ in the organic diluent, resupplying fresh diluent while maintaining constant $BF_3$ pressure over the liquid and continuously supplying the $BF_3$ solution to the reaction vessel by any convenient means. For example, in EDC containing about 260–280 ppm water at about 39° C and 108 psia $BF_3$ partial pressure, about a 1.5 weight percent solution of $BF_3$ is obtained which is dilute enough that it can be easily fed to the reactor in a carefully controlled fashion.

In a preferred mode, the styrene monomer solution is, immediately prior to the first point of contact with the cation generator, brought to approximately the temperature that is to be maintained in the first stage of the reaction vessel; preferably to about 50°–85° C and most preferably to about 60°–70° C for the products of higher $\overline{M}_w$ and to about 90°–180° C, most preferably to about 100°–160° C for the products of about 200–1,000 $\overline{M}_w$. This tends to narrow the $\overline{M}_w/\overline{M}_n$ ratio. Especially at the higher temperatures, the monomer solution should be brought to the reaction temperature as rapidly as possible and contacted as quickly thereafter as possible with the cation generator. At the upper limits of the temperature range, e.g., 130°–180° C, it may be desirable to increase the level of radical scavenger normally present in most commercial styrene monomer to avoid significant thermal polymerization of the monomer. These are materials such as t-butyl catechol, methyl ether of hydroquinone and similar well-known inhibitors.

In another preferred mode the reaction mass, subsequent to the final point of injection of cation generator, is not substantially cooled by heat exchange and substantially all (about 80–90 percent or more) the heat of reaction generated subsequent to the final injection point is left in the reaction mass until the final polystyrene product contains less than about 0.1 weight percent, most preferably less than about 0.05 percent, residual unsaturation. Residual unsaturation is determined by iodine monochloride titration. Residence time in the final segment of the reaction vessel is maintained for a suitable time to attain this desired result and excess cation generator may also be added to the final stage to accomplish this.

After the reaction is complete, residual $BF_3$ is suitably neutralized with ammonia. The resultant $BF_3$:ammonia complex is then removed by precipitation and filtration or a water wash. Alternatively, $BF_3$ or other proton generators may be removed by contacting the reaction mass with a dry, weak-base ion exchange resin, preferably of the macroporous type, such as Dowex MW-1 resin or the like. The exhausted resin may be regenerated or discarded, as desired.

SPECIFIC EMBODIMENTS

Example 1

A polystyrene of about 13000 $\overline{M}_w$ and about 5 $\overline{M}_w/\overline{M}_n$ is prepared by preheating about a 30 weight percent solution of styrene in ethylene dichloride, containing about 100 ppm water based on styrene, to about 60° C prior to passing said solution through a reactor vessel comprising 4 seqments of shell and tube heat exchanger with water-cooling of the shell. Boron trifluoride in ethylene dichloride is injected into the reaction vessel at 4 points along its length so that the total amount of $BF_3$ is about 1500 ppm based on total weight of styrene. Good mixing is provided by baffles in the reaction vessel just subsequent to each injection point. The total $BF_3$ injected at the 4 points is apportioned approximately 35:15:20:30 respectively for the first, second, third and fourth injection points.

Cooling of the segment of the reactor following the first injection point maintains a reaction mass temperature of about 75° C prior to the second injection point, in the second segment it is cooled to about 50° C prior to the third injection point and then allowed to rise to about 65° C prior to the fourth injection point and remains at about 65° C by the time the reaction mass leaves the reactor. The reaction mass is then contacted with sufficient ammonia to neutralize residual $BF_3$ and the ammonia:$BF_3$ complex is removed by precipitation and filtration or a brief water wash. Ethylene dichloride is thereafter distilled off at about 85°–120° C to leave a polystyrene product having less than about 0.1 weight percent residual unsaturation, based on the polystyrene product.

Example 2

In the manner described in Example 1, a 30 percent solution of styrene monomer in EDC, containing about 75 ppm water, is preheated to about 75° C, then contacted with a total of about 1600 ppm $BF_3$, injected at 4 points. The $BF_3$ is apportioned approximately 46:42:6:6 for the first, second, third and fourth injection points, respectively. The average temperature in the reactor segments following the 4 injection points is about 85° C, 78° C, 75° C and 72° C, respectively. The polystyrene product has a $\overline{M}_w$ of about 4400 and a $\overline{M}_w/\overline{M}_n$ ratio of about 2.9.

Example 3

In a like manner, a 15 percent solution of styrene monomer in EDC, containing about 50 ppm water, is fed at about ambient temperature of 20° C to the reactor and therein contacted with a total of about 2500 ppm $BF_3$, injected at 4 points. The $BF_3$ is apportioned approximately 24:17:24:35 for the first, second, etc. injection points, respectively and the average temperature in the respective segments is about 26° C, 67° C, 51° C and 31° C. The polystyrene product has a $\overline{M}_w$ of about 28,800 and a $\overline{M}_w/\overline{M}_n$ ratio of about 4.5 with about 0.6 percent residual unsaturation.

What is claimed is:

1. A continuous process for making a polystyrene having a $\overline{M}_w$ between about 200 and about 1,000 and a $\overline{M}_w/\overline{M}_n$ ratio of less than about 8 comprising contacting, in 2 or more stages, a solution of styrene monomer in a first inert organic diluent with a cation generator, under substantially isothermal conditions in each stage, at a temperature between about 90° C and about 180° C in a manner such that said styrene monomer, prior to the final stage, is always present in greater than a stoichiometric amount with respect to said cation generator.

2. The process of claim 1 wherein said cation generator is produced by contacting boron trifluoride with an activating amount of water.

3. The process of claim 2 wherein said cation generator is produced in situ in the solution of styrene monomer.

4. The process of claim 2 wherein the total amount of boron trifluoride contacted with the solution of styrene monomer is about 500 to about 2500 ppm based on the total weight of styrene monomer and the total amount of water is about 0.5 to about 10 weight percent of the total amount of boron trifluoride.

5. The process of claim 2 wherein the inert organic diluent comprises toluene or benzene.

6. The process of claim 2 wherein the boron trifluoride contacted with said water is boron trifluoride dissolved in a second inert organic diluent which may be the same as the first inert organic diluent.

7. The process of claim 2 wherein about 25 to 40 percent of the stoichiometric amount of said cation generator is contacted with styrene monomer in the first stage.

8. The process of claim 1 which is carried out at a temperature between about 100° C and about 160° C in three or more stages.

9. The process of claim 8 wherein the solution of styrene monomer, immediately prior to contact with said cation generator, is at a temperature between about 100° C and about 160° C.

10. The process of claim 1 wherein the concentration of styrene monomer in said first inert organic diluent is less than about 50 weight percent.

11. The process of claim 1 for making polystyrene which is further characterized by leaving in the reaction mass substantially all the heat of reaction generated subsequent to final stage of contact of styrene monomer and said cation generator until the final polystyrene product contains less than about 0.1 weight percent residual unsaturation.

12. The process of claim 1 wherein contact of the solution of styrene monomer with said cation generator is carried out by injecting said cation generator, in 2 or more stages, into the solution of styrene monomer.

* * * * *